United States Patent [19]

Monson et al.

[11] 4,008,059
[45] Feb. 15, 1977

[54] CENTRIFUGAL SEPARATOR

[75] Inventors: Donald R. Monson, West St. Paul, Minn.; Thomas E. Rosendahl, McMurry, Pa.

[73] Assignee: The United States of America as represented by the Secretary of the Army, Washington, D.C.

[22] Filed: May 6, 1975

[21] Appl. No.: 574,975

[52] U.S. Cl. .................................. 55/396; 55/431; 55/448; 55/457; 55/466
[51] Int. Cl.² ....................................... B01D 45/14
[58] Field of Search ............ 55/456, 457, 448–450, 55/452, 396, 431, 466; 209/144, 211; 210/512 R

[56] References Cited

UNITED STATES PATENTS

| 791,517 | 6/1905 | Walker | 55/457 X |
|---|---|---|---|
| 2,415,935 | 2/1947 | Bullock | 55/457 X |
| 2,662,610 | 12/1953 | Heinrich | 55/452 X |
| 2,708,033 | 5/1955 | Thomas | 209/144 |
| 2,806,551 | 9/1957 | Heinrich | 55/456 X |
| 3,448,563 | 6/1969 | Sobeck | 55/450 X |
| 3,517,821 | 6/1970 | Monson et al. | 55/449 X |
| 3,603,062 | 9/1971 | Robbins et al. | 55/457 X |
| 3,611,679 | 10/1971 | Dall | 55/457 |
| 3,747,309 | 7/1973 | Meier et al. | 55/457 X |
| 3,793,812 | 2/1974 | Willis | 55/457 X |
| 3,884,660 | 5/1975 | Perry, Jr. et al. | 55/456 X |
| 3,885,934 | 5/1975 | Eads et al. | 55/457 |

FOREIGN PATENTS OR APPLICATIONS

| 282,570 | 3/1971 | U.S.S.R. | 55/457 |

*Primary Examiner*—Frank Lutter
*Assistant Examiner*—Kathleen J. Prunner
*Attorney, Agent, or Firm*—Peter A. Taucher; John E. McRae; Nathan Edelberg

[57] ABSTRACT

A miniature centrifugal separator for use in an engine air cleaner. Two clean air take-off tubes are coaxially aligned in the main flow tube for successively removing selected fractions of the outer annular portion of the swirling gas stream. The clean air tubes are spaced pre-selected distances downstream from the swirl means such that entrained dust particles are enabled to complete approximately one swirl revolution prior to encountering each take-off tube. The invention seeks to accomplish a relatively high collection efficiency with a relatively short flow tube.

2 Claims, 4 Drawing Figures

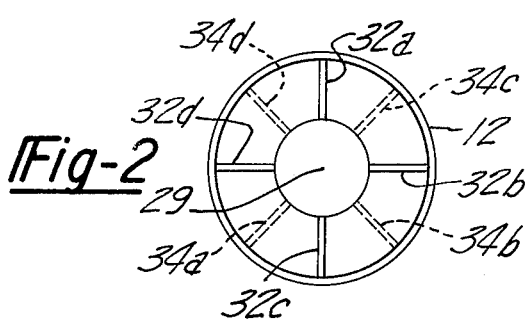
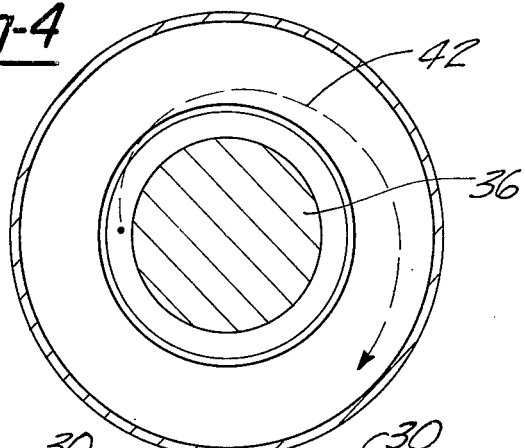
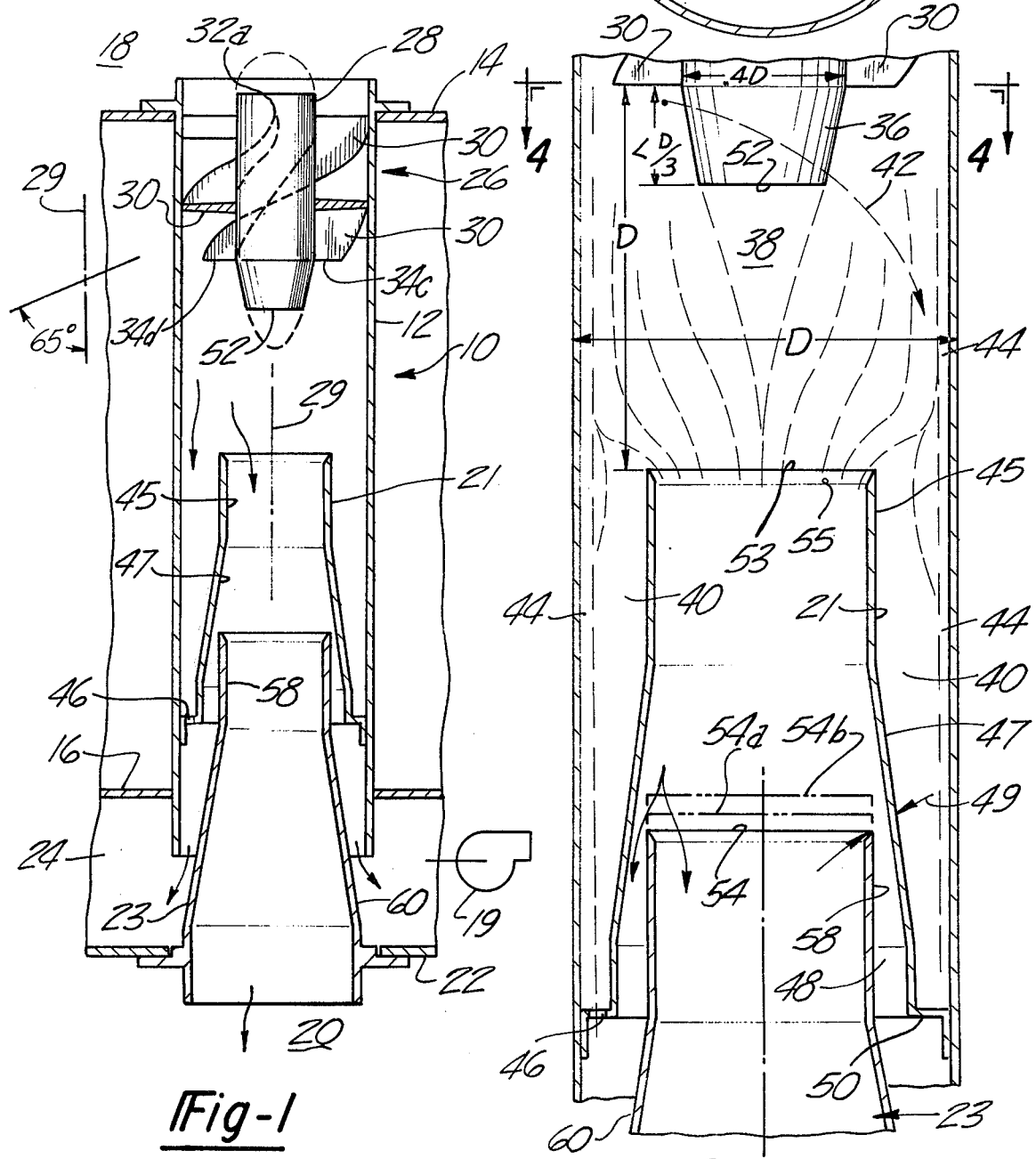

CENTRIFUGAL SEPARATOR

The invention described herein was made in the course of a contract with the Government. The described invention may be manufactured, used and licensed by or for the Government for Governmental purposes without the payment to us of any royalties thereon.

BACKGROUND AND SUMMARY OF THE INVENTION

The invention is directed to a miniature centrifugal separator comprising a circular flow tube having a swirl-inducing vane structure in its upstream end, and two or more clean air take-off tubes stacked one behind another along the flow tube axis. Swirl action of the vanes produces an outward migration of the dust particles toward the flow tube wall. A conventional induced draftfan draws a stream of concentrated dust from the tube wall area beyond the entry zone of the first take-off tube; partially cleaned gas is caused to flow into the first clean air take-off tube. The partially cleaned gas flows into a flaring (frusto-conical) section of the first take-off tube where it encounters the second take-off tube. Centrifugal forces present in the still-swirling gas cause dust particulates to be thrown into the flaring space surrounding the second tube; purified gas flows through the second take-off tube to the point of use. Dust particulates are removed by the aforementioned fan.

Each take-off tube provides a distinct dust separation zone. By suitably controlling the flow resistances of the different zones it is believed possible to adjust the component flows and component energy consumptions, to thereby obtain relatively high total collection efficiency. The length of each tube and its position relative to the main flow tube are preselected in accordance with the swirl angle so that the dust particles are enabled to complete approximately one swirl revolution before reaching the next separation zone. As before noted, the invention seeks to achieve high collection efficiency in a relatively small length flow tube.

THE DRAWING

FIG. 1 is a sectional view through a tubular separator constructed according to the invention.

FIG. 2 is a top plan view of the FIG. 1 separator.

FIG. 3 is an enlarged fragmentary view of the FIG. 1 separator.

FIG. 4 is a sectional view on line 4—4 in FIG. 3.

GENERAL ARRANGEMENT

FIG. 1 shows a centrifugal separator 10 comprising a main flow tube 12 extending from a first tube sheet 14 to a second tube sheet 16. The space 18 above tube sheet 14 constitutes a supply zone for dust-laden air. The space 20 below a third tube sheet 22 constitutes a zone of purified air. Space 24 between tube sheets 16 and 22 constitutes a dust concentrate zone. When the separator is used in an engine, air cleaner space 20 is subjected to the engine intake vacuum to draw air downwardly through main tube 12 and clean air take-off tubes 21 and 23. A small induced draft fan 19 communicates with space 24 to draw dust concentrates out of the air stream.

A complete air cleaner would include a "bank" of tube assemblies similar to the FIG. 1 assembly. Each tube assembly would handle a fractional share of the total air flow. For example, if the total air flow requirement for a given engine was 200 cubic feet per minute, each tube might supply 27 c.f.m. to space 20; a total of eight flow tubes 12 would then be required. The induced draft fan normally would draw off the separated dust and approximately ten percent of the air admitted to each tube 12; this so-called "scavenger air" is required to keep the dust particles fluidized and flowing after such particles have separated out of the flow stream produced by the engine intake vacuum applied to space 20. The scavenger air requirements necessitate a slightly higher volumetric flow rate through the inlet end of flow tube 12 compared to the flow rate at the exit end of tube 21. Thus 30 c.f.m. admitted to tube 12 from space 18 divides into 27 c.f.m. through tube 23 and 3 c.f.m. through space 24.

In its upstream end flow tube 12 is provided with a stationary swirl means 26 comprised of a cylindrical hub 28 and four swirl vanes 30. Each swirl vane includes an upstream edge 32a, 32b, 32c, and 32d, and a downstream edge 34a, 34b, 34c, and 34d suitably located to induce counterclockwise swirl to the entering gas. Each vane has a chord length of at least 90° measured along the tube circumference, whereby the vanes overlap one another in the axial direction; such an overlap ensures the application of swirl force to each dust-air particle, either aerodynamically or by direct deflection. The FIG. 1 vanes have chord lengths of about 135°, which provides vane overlap of about 45°.

The swirl angle of the dusty gas is determined by the attack angle of the vanes relative to the flow axis 29. In the FIG. 1 separator the vane attack angle is approximately 65°. Larger attack angles produce greater swirl per unit travel at the expense of greater pressure drop. In general we prefer to use vane attack angles between approximately 55° and 70°.

The hub structure of FIGS. 1 and 3 includes a frusto-conical tail 36 for reducing pressure losses. FIG. 3 illustrates by dashed lines the presumed flow demarcation lines, exclusive of local eddies and minor disturbances. The minimal flow areas are the area 38 just downstream from tail 36 and the annular area 40 along the outer surface of take-off tube 21. During flow from swirl vanes 30 to the upstream edge of tube 21 a substantial percentage of the dust particles presumably migrate outwardly in a helical fashion as depicted by dashed line 42 in FIGS. 3 and 4. Those particles thrown into the peripheral zone 44 are presumably drawn out of the main stream and eventually through port 46 into space 24. Fan 19 maintains a negative pressure condition below port 46 for withdrawing dust concentrates through the port; the actual separating force is provided primarily by the swirl imparted to the dust particles by vanes 30.

Some particulates do not reach peripheral zone 44; those particles remain in the mainstream flowing into tube 21. The partially clean gas remains in a swirling condition as it flows downwardly through tube 21 toward the entering edge of the second take-off tube 23. The swirl produces a continuing outward migration of dust particles toward the cylindrical wall portion 45 of tube 21. Prior to reaching tube 23 the partially cleaned gas moves into a flaring frusto-conical portion 47 of tube 21. The upstream edge of tube 23 divides the flow as depicted by the arrows in FIG. 3. Purified gas flows into tube 23; gas containing particulates flows into annular space 48 surrounding tube 23. The magnitude of the flow into space 48 is presumably a function of the size of annular port 49, the pumping capability of fan 19 (FIG. 1), and the swirl energy remaining in the gas when it reaches port 49. In general, the total scavenger air flow through ports 49 and 46 should be kept reasonably small in relation to the main flow through take-off tube 23; otherwise the scavenger flow will constitute an excessive energy consumption. Also, the total scavenger energy consumption should be associated primarily with the stream flowing through space 48, since that stream contains the lighter particles that require maximum energy input for separation from the mainstream. Energy consumption is related to flow rate. The relative flows through ports 46 and port 49 can be selected by varying the relative sizes of the ports. The size of port 46 can be varied by varying the number of port openings in radial wall 50 (FIG. 3) or by varying the circumferential extent of one or more port openings. The size of port 49 can be varied by adjusting the degree of telescopment of tube 23 into tube 21; e.g. upward adjustment of tube 23 puts its cylindrical edge nearer the frusto-conical wall 47, thereby reducing the size of annular port 49. The port size selection would usually be made during the design period; possibly the size of tube 23 could be varied during service by using a screw thread connection between tube 23 and sheet 22. Since port 46 is relatively inaccessible it would probably be difficult to change its size during service.

SWIRL VANE DESIGN

The present invention is concerned primarily with a miniature collector wherein main flow tube 12 has a relatively small diameter on the order of one and one half inches. A design objective was to provide a collector having a total length of only about six inches but capable of handling 30 cubic feet of gas per minute with a pressure drop from zone 18 to zone 20 not exceeding 10 inch w.g. while obtaining collection efficiencies of 93%, using a scavenger flow not exceeding 10% (i.e. 3 c.f.m. discharged to space 24 and 27 c.f.m. discharged to space 20). The six inch collector depicted in FIGS. 1 and 3 actually achieved average collection efficiencies on fine and coarse dusts of approximately 89%; with a pressure drop of about 13 inch w.g.; this compares favorably with collection efficiencies on the order of 85% for the collector which it was designed to replace.

The upper limit on pressure drop tended to limit the range of vane attack angles that could successfully be employed in the FIG. 1 separator. Thus, the two "stacked" take-off tubes 21 and 23 produced a pressure drop that was somewhat larger than that produced by the conventional "single take-off tube" structure. As a result, the vanes themselves had to be selected to produce a relatively low pressure drop in order to keep the total drop within reasonable limits. It was found that a vane attack angle of about 65° provided the best compromise of reasonable pressure drop and reasonable collection efficiency.

It would be expected that larger vane attack angles would produce higher collection efficiencies than smaller vane attack angles, due to the greater swirl energy that such vanes would impart to the dusty gas. In actuality it was found that with certain hub-tube ratios the collection efficiency using 65° vanes was higher than efficiencies obtained either with 56° vanes or 70° vanes.

The ratio between the hub diameter and the tube diameter appears to have some effect on performance. Using a tube diameter of 1.5 inches the best hub diameter was about 0.6 inch; this corresponded to a hub-tube diameter ratio of 0.4. It is theorized that small diameter hubs (less than 0.6 inch) permitted a representative number of dust particles to be located too close to the tube axis to migrate into the first "separator" zone 44 (FIG. 3) by the time the stream reached the mouth of tube 21; the flow into the tube 21 therefore contained an excessive number of dust particles in or near the "core" space remote from tube wall 45.

Large diameter hubs (substantially greater than 0.6 inch) tended to produce abnormal pressure drops without collection efficiency increases proportionate to the increased energy expenditures. It is believed that large diameter hubs tended to unduly enlarge the stagnation low pressure zone 38. This in turn reduces the induced swirl in the separated zone and increases the distance particles must be radially migrated to reach the main vortex. The result is a lowered efficiency on the particles that become entrained in this zone.

It is also noted that large diameter hubs increase the amount of low velocity boundary layer fluid near the hub surface. At the same time the radial thickness of the flow annulus between the hub surface and the tube wall is reduced, thereby increasing the velocity between the vanes. As the vanes turn the flow, particulates are centrifuged onto the high pressure side of the vane. The relative eddy between the vanes due to irrotational flow and the radial pressure gradients in the vane boundary layers due to their pressure distributions combine to produce a secondary flow of fluid and particles into the hub boundary layer.

On the basis of work using flow tube diameters of 1.5 inches and swirl vane attack angles of about 65°, the optimum hub-tube diameter ratio appears to be approximately 0.40

It will be noted that the nose of the FIG. 1 hub is defined by a flat blunt surface; also, the tail 36 includes a flat downstream surface 52. Tests were run on various hub nose and tail configurations, including spherical and bullet nose shapes, and elongated parabolic tail shapes. The nose-tail shapes shown in full lines in FIG. 1 proved to be the best from the standpoint of pressure drop and collection efficiency. The optimum tail shape was a frusto-conical extension of the hub having a length slightly less than one half inch and a taper angle of approximately 5°. Presumably this tail dimension allowed the boundary layer gas to separate from the tail surface with an optimum combination of pressure drop and separation efficiency. Longer parabolic tails (as shown in phantom in FIG. 1) had the presumed undesired effect of releasing hub boundary layer particulates closer to take-off tube 21 giving them insufficient residence time to be separated. The truncated tail 36 shown in FIG. 1 thereby permits centrifugal forces to be quickly effective on the particles originally located near the hub surface.

TUBE 21 DESIGN

Tube 21 should be located a sufficient distance from vanes 30 as to permit a representative number of dust particles to be thrown in or at least near the outer zone 44. With a swirl vane angle of 65° and a hub diameter of 0.6 inch the calculated axial distance for a particle located at the hub surface to complete one swirl revolution is about 1.3 inches. As depicted in FIG. 4, a particle originally located near the hub could conceivably undergo outward migration into zone 44 in less than one swirl revolution.

Actual test runs of a miniature collector with tube 21 set at different distances from vanes 30 showed that optimum collection efficiency occurred when the upstream edge of tube 21 was spaced from the trailing edges of vanes 30 by a distance ranging from about 1.5 inches to about 2.2 inches. When the vane-tube 21 spacing was either increased or decreased from this range of values (1.5 – 2.2 inches) the collection efficiency was reduced. It is concluded that for miniature collectors the vane-take off tube spacing should be a distance about the same as one flow tube diameter, e.g. 1.5 inches. Increasing the distance above this value apparently has no advantage.

The drop-off in collection efficiency when the vane-take off tube spacing was reduced below the 1.5 – 2.2 inches range was presumably due to the inability of the gas to complete at least one swirl before reaching the mouth of tube 21 (i.e. insufficient dwell time before reaching the take-off tube). The drop-off in collection efficiency when the vane-take off tube spacing was increased above the 1.5 – 2.2 inches range was presumably due at least in part to vortex decay; the longer spacing may have also had the effect of increasing the size of stagnation zone 38, and hence its deleterious effect on outward particle migration.

The collection efficiency and pressure drop are influenced by the diameter of tube 21. When the tube diameter is relatively large the pressure drop is reduced, but the collection efficiency suffers. The collection efficiency can be improved by reducing the tube 21 diameter, but at the expense of increased pressure drop. For a main flow tube diameter of 1.5 inches the optimum diameter of the first take-off tube 21 (at its inlet mouth) appears to be about 0.83 inch.

The optimum tube 21 diameter of 0.83 inch may bear some significance to the optimum diameter of hub 28 (0.6 inch). Assuming a given tube 21 diameter, if the hub diameter is relatively small, dust particles near the hub surface must migrate a further radial distance to escape beyond tube 21 (into annular space 44) than if the hub diameter were relatively large. Assuming a given hub diameter, if the tube 21 diameter is relatively large, dust particles near the hub surface must migrate a further radial distance to escape beyond tube 21 than if the tube diameter were smaller. The hub-tube diameter ratio might be said to represent the migration resistance of the tube system. For miniature collectors a tube 21-hub 28 diameter ratio of approximately of 0.83/0.6 or 1.4 might be considered optimum.

The cone angle of frusto-conical wall 47 can presumably vary within limits; a cone angle of about seven degrees was employed in the test devices. The main criteria is presumably a sufficiently small cone angle as will deter boundary layer separation and harmful eddies as the gas passes into the frusto-conical passage.

TUBE 23 DESIGN

The upstream edge 54 of tube 23 should be spaced from the upstream edge 53 of tube 21 a sufficient distance so that swirl forces in the flowing gas have an opportunity to produce a significant outward migration of the dust particles toward the tube 21 surface. Assuming a representative particle is located at point 55 when it enters tube 21 (about 0.25 inch from the tube axis), such a particle would require about one inch axial travel distance to complete one swirl revolution (assuming a swirl angle of 65°). It is believed that most particles will be centrifugally thrown into close proximity to the wall of tube 21 by the completion of one swirl revolution. In the device of FIG. 1 tube 23 was usually placed in tube 21 so that upstream edge 54 of tube 23 was spaced from edge 53 of tube 21 by approximately one inch. Such a distance is believed sufficient to achieve the inertial separation effect. A larger spacing of edges 54 and 53 would presumably lengthen the overall collector length without improving collection efficiency. A larger spacing of edges 54 and 53 might have an adverse effect in regard to promoting decay of the vortex.

Tube 23 includes an upstream cylindrical section 58 and a downstream frusto-conical section 60. Section 60 serves as a pressure recovery device to lessen the losses that occur when the purified gas discharges into space 20. Cylindrical section 58 serves as a flow divider to direct dust concentrates into space 48 and purified gas into tube section 60. Experiments indicate that cylindrical section 58 should have the same diameter as cylindrical section 45 of tube 21. When section 58 was constructed with a larger diameter than section 45, the collection efficiency decreased approximately one percent.

RESTRICTION SIZING

The overall collection efficiency and performance are affected by the size of restriction 46 and the size of annular restriction 49. If restriction 46 has a given area, e.g. 0.015 in$^2$, the relative flows through ports 46 and 49 can be varied by varying the size of port 49, as for example by adjusting tube 23 upwardly or downwardly to selected positions in the fashion depicted generally by the dashed lines 54$a$ and 54$b$ in FIG. 3. With scavenger fan 19 adjusted to extract 10% of the total supply gas, an increase in the size of port 49 tends to increase the flow through port 49 and reduce the flow through port 46. The variation in relative flows through ports 49 and 46 appears to have an effect on collection efficiency. For example, with port 46 set at 0.015 in$^2$ and port 49 set at 0.037 in$^2$ the collection efficiency was about 88.4%, whereas with port 46 set at 0.015 in$^2$ and port 49 set at 0.083 in$^2$ the collection efficiency was about 89.5%. With port 46 set at 0.015 in$^2$ and port 49 set at about 0.41 in$^2$ the collection efficiency dropped to about 88.0%. Experiments indicate that with port 46 set at 0.015 in$^2$ the optimum size for port 49 is about 0.083 in$^2$. The port size ratio is 0.015/0.083 or 0.18.

Experiments using 10% scavenger air were run with different sizes for port 46. Size variation was accomplished by varying the number of ports in radial wall 50. Two circumferentially spaced ports were formed in wall 50 to provide a total port 46 area of about 0.039 in$^2$; three circumferentially spaced ports were formed in wall 50 to provide a total port 46 area of about 0.080 in$^2$. With the total area of port 46 set at 0.039 in$^2$ an optimum collection efficiency of about 89.3% was achieved when port 49 was set at about 0.096 in$^2$; this corresponds to a port size ratio of 0.039/0.096 or 0.40. When the size of port 49 was increased to about 0.165 in$^2$ the collection efficiency was about 89.1%; the corresponding port size ratio was 0.039/0.165 or 0.24.

With the total area of port 46 set at 0.080 in$^2$ the optimum collection efficiency of 88.9% was achieved when port 49 was set at about 0.134 in$^2$; the corresponding port size ratio was 0.59.

In general, the pressure drop measured across space 18 and space 20 (termed the primary pressure drop) tended to increase as the size of port 46 increased. Thus, when port 46 was set at 0.015 in$^2$ the pressure drop at the optimum collection efficiency was about 13.7 in. w.g. When port 46 was set at 0.039 in$^2$ the primary pressure drop at the optimum collection efficiency was about 14.2 in. w.g. When port 46 was set at 0.080 in$^2$ the primary pressure drop at the optimum collection efficiency was about 16.2 in. w.g.

It is of course desirable to obtain the best compromise of reasonably high collection efficiency and reasonably low pressure drop. On the basis of the test results with the above-described miniature flow tube the best overall result was obtained when port 46 was set at approximately 0.015 in$^2$ and port 49 was set at about 0.083 in$^2$. This corresponds to a port size ratio of approximately 0.2.

Various interpretations could be placed on the test results. However the results are believed to generally indicate the desirability of sizing ports 49 and 46 so that flow through port 46 is appreciably less than flow through port 49. Presumably the "separated" stream 44 flowing through port 46 contains predominately the heaviest dust particles that are most easily separated from the gas stream; with a given total energy available for separation purposes (e.g. 13 in. w.g. primary pressure drop) it would seem desirable to use as small an energy expenditure as possible on the larger easily-separated particles, leaving a greater percentage of the total energy in the gas for later separation of the smaller less-easily collected particles. Restricting the flow through port 46 reduces the energy expenditure devoted to separating the largest particles, leaving more swirl energy in the gas passing into tube 21.

The diameter of tube 21 being smaller than the diameter of main flow tube 12, the gas-dust stream is contracted to have an accelerated linear velocity in section 45 of tube 21; the accelerated linear flow rate produces high centrifugal forces on the remaining entrained dust particles, thereby producing further outward migrational movements of the dust particles and hence higher dust concentration in the stream flowing through port 49. Acceleration of the flow rate in section 45 of tube 21 is enhanced when the components are sized so that port 46 accepts a lesser percentage of the total scavenger flow and tube section 21 accepts a greater percentage of the total scavenger flow.

Presumably the principal advantage in optimized sizing of ports 46 and 49 (so that port 49 handles most of the scavenger flow) resides from the fact that edge 54 of tube 23 then has the capability of directing a thicker annular mass into port 49. Such a thicker annular mass will contain more particulates than a thinner annular mass of a given circumferential velocity.

FEATURES OF THE INVENTION

A principal feature of the invention relates to the sizing of hub 28 in relation to main flow tube 12 so that hub 28 has a diameter that is approximately 40% of the main flow tube diameter. At lower hub-tube 12 diameter ratios excessive particulate quantities were passed directly into the core zone of separator tube 21; at higher hub-tube 12 diameter ratios excessively large pressure drops were produced.

A related feature of the invention is the vane attack angle of sixty five degrees, and the axial spacing of tube 21 from the vane trailing edges 34 by a distance approximately the same as the diameter of flow tube 12. With this relationship a significant percentage of the dust particles are centrifugally thrown into the first separated stream 44 before reaching the first separator tube 21.

Another feature of some importance is the sizing of ports 46 and 49 so that port 46 is about 0.2 times port 49. Such a size relationship apparently regulates the relative flows through the two separation zones so that the total energy expenditure is distributed or utilized where it will be most effective for best overall collection efficiency and minimum pressure drop in the primary stream.

Other inventive features are believed to reside in the frusto-conical tail 36, and the sizing of separator tubes 21 and 23 so that each of these tubes has a diameter as its leading edge that is approximately 1.4 times the diameter of hub 28.

A miniature collector using the above-noted features is constructable as a relatively short structure on the order of six inches long, thereby adapting itself to use in an engine air cleaner of the self-cleaning type; i.e. a cleaner useful in dusty or sandy environments without need for cleaner maintenance or replacement.

We wish it to be understood that we do not desire to be limited to the exact details of construction shown and described for obvious modifications will occur to a person skilled in the art.

In the attached drawings dimension D represents the diameter of the main flow tube. The dimension of the swirl hub structure 28 is represented as 0.4D. The axial dimension of tail 36 is denoted as D/3, meaning a value slightly less than one third the main flow tube diameter.

As previously noted, a complete air cleaner for an engine would include a bank of miniature cleaner elements constructed according to the attached drawings. The cleaner elements can be mounted in a rectangular or circular frame containing the various tube sheets 14, 16 and 22. Tube sheet 14 is the "inlet" wall and tube sheet 22 is the "outlet" wall. Each tube 23 discharges clean gas to the engine, e.g. the inlet manifold. The space 24 between tube sheets 22 and 16 communicates with the exhaust fan 19 leading to the ambient atmosphere.

Tube sheets 14 and 16 constitute the mounting means for each main flow tube 12. Tube sheet 22 constitutes the mounting means for take-off separator tube 23. The other separator tube 21 is concentrically mounted within tube 12 by means of the radial wall 50 (FIG. 3). The aforementioned port 46 is formed by one or more openings in wall 50. The size of port 46 is determined by the circumferential length of the openings; i.e. the lengths of the segmental spaces between the spokes formed by radial wall 50.

As previously noted, a feature of this invention is the size ratio (approximately .2) between scavenger ports 46 and 49. The relative size of these ports determines relative flow rates, swirl velocities and energy expenditures. In general, port 46 is sized small enough to draw off large size particles with minimum subtraction of whirl energy. This sizing permits the partially-cleaned gas to have a substantial percentage of its original whirl energy when it reaches annular port 49.

We claim:

1. A miniature centrifugal separator comprising a cylindrical imperforate main flow tube having an upstream end for receiving a stream of dust-laden gas, and a downstream end for discharging concentrated dust;

swirl means within the upstream end of the main flow tube for imparting centrifugal force to the dust particles in the dust-laden gas; said swirl means comprising a hub coaxially located in the main flow tube, and helical vanes extending outwardly from said hub at acute angles to the tube axis; the hub diameter being approximately 40% of the main flow tube diameter, and the swirl vanes being angled to the flow tube axis at approximately 65°; said hub having a frusto-conical tail extending downstream beyond the trailing edges of the vanes for a distance that is slightly less than one third the diameter of the main flow tube;

a first separator tube coaxially located within the main flow tube downstream from the swirl means; said first separator tube comprising a leading cylindrical section and a trailing frusto-conical section flaring outwardly from its point of connection with the cylindrical section; the cylindrical section of the first separator tube having a diameter that is approximately 1.4 times the hub diameter; the cylindrical section of the first separator tube defining an annular flow separator edge (53) that is spaced downstream from the swirl vanes by a distance that is approximately the same as the diameter of the main flow tube;

wall means (50) joining the first separator tube to the main flow tube; said wall means having at least one opening therethrough defining a first dust scavenger port;

a second separator tube coaxial with the main flow tube and downstream from the first separator tube; said second separator tube comprising a leading cylindrical section and a trailing frusto-conical section flaring outwardly from its point of connection with the cylindrical section; the cylindrical section of the second separator tube having approximately the same diameter as the cylindrical section of the first separator tube;

the cylindrical section of the second flow separator tube defining an annular flow separator edge (54) that cooperates with the inner surface of the frusto-conical section of the first separator tube to define a second dust scavenger port; the second separator tube being telescoped into the first separator tube so that the first scavenger port and second scavenger port having a size ratio of approximately 0.2;

and means for producing a scavenger flow force on the first and second ports, whereby dust particles are drawn through the ports while relatively clean gas flows through the second separator tube.

2. The separator of claim 1 wherein the main flow tube has a diameter of approximately 1.5 inches.

* * * * *